US011978193B2

United States Patent
Plant et al.

(10) Patent No.: US 11,978,193 B2
(45) Date of Patent: May 7, 2024

(54) LABEL DATA PROCESSING SYSTEM

(71) Applicant: Prisymid Limited, Wokingham (GB)

(72) Inventors: Robert Graham Plant, Wokingham (GB); Thomas Matthew Andrew Todd, Wokingham (GB)

(73) Assignee: Prisymid Limited (GB)

( * ) Notice: Subject to any disclaimer, the term of this patent is extended or adjusted under 35 U.S.C. 154(b) by 316 days.

(21) Appl. No.: 16/979,460

(22) PCT Filed: Mar. 7, 2019

(86) PCT No.: PCT/GB2019/050646
§ 371 (c)(1),
(2) Date: Sep. 9, 2020

(87) PCT Pub. No.: WO2019/171070
PCT Pub. Date: Sep. 12, 2019

(65) Prior Publication Data
US 2021/0374926 A1 Dec. 2, 2021

(30) Foreign Application Priority Data
Mar. 9, 2018 (GB) .................................. 1803795

(51) Int. Cl.
*G06T 7/00* (2017.01)
*G06V 10/98* (2022.01)
*G06V 30/412* (2022.01)

(52) U.S. Cl.
CPC ............ *G06T 7/001* (2013.01); *G06V 10/993* (2022.01); *G06V 30/412* (2022.01);
(Continued)

(58) Field of Classification Search
CPC ........... G06T 7/001; G06T 2207/10008; G06T 2207/10024; G06T 2207/30144; G06V 10/993; G06V 30/412
See application file for complete search history.

(56) References Cited

U.S. PATENT DOCUMENTS

2002/0087574 A1 7/2002 Walsh et al.
2006/0091216 A1 5/2006 Page
(Continued)

FOREIGN PATENT DOCUMENTS

JP 200412360 1/2004
JP 2004265205 A 9/2004
(Continued)

OTHER PUBLICATIONS

Austrailian Examination Report dated Jul. 17, 2023 for AU2019232388.

*Primary Examiner* — Samir A Ahmed
(74) *Attorney, Agent, or Firm* — Dorsey & Whitney LLP

(57) ABSTRACT

A product label printing and checking system, comprising data processing means configured to: control the printing of product labels; control the acquisition and reception of images of the printed labels by an image acquisition device such as an optical scanner; and check the printed labels for defects, wherein each printed label accords with a label format specification for that label, whereby the label has a common layout and comprises printed product-related information located in one or more regions on the label, wherein the data processing means includes a label checking module in which there is provided a reference image of the label, and the checking module is configured so that the acquired images are sequentially compared against the reference image according to pre-determined quality control indicators relating to the expected information content and location in the label regions, and wherein the label is flagged for review or rejection if it is non-compliant. The label format specification may be determined and/or stored before a print run, in the form of an accessible file. This may then be retrieved by the label printing and checking system before a print run using that label format. In an aspect of the invention the label format specification may be used to provide instructions to be sent to a printer for the printing of
(Continued)

each label. The reference image and its associated inspection mask may thus be configured in real time by assembling specifications for label region location, region information and inspection tool, and optionally inspection tool parameters.

18 Claims, 5 Drawing Sheets

(52) U.S. Cl.
CPC ............ *G06T 2207/10008* (2013.01); *G06T 2207/10024* (2013.01); *G06T 2207/30144* (2013.01)

(56) References Cited

U.S. PATENT DOCUMENTS

| | | | | |
|---|---|---|---|---|
| 2015/0356717 | A1* | 12/2015 | Madden | H04N 1/00082 |
| | | | | 358/1.6 |
| 2016/0275368 | A1* | 9/2016 | Akiyama | G06Q 10/083 |
| 2019/0073501 | A1* | 3/2019 | Chiu | G06K 7/1413 |
| 2020/0005449 | A1* | 1/2020 | Ambikapathi | G06V 10/764 |

FOREIGN PATENT DOCUMENTS

| | | |
|---|---|---|
| JP | 2005208847 A | 8/2005 |
| JP | 2016121980 A | 7/2016 |

* cited by examiner

| | | |
|---|---|---|
| Use Wizard | True | |
| | Block | |
| Region name | Text | ✎ |
| Locked (from Wizard) | False | |
| Fixture | Label Stock ▾ | |
| Inspection Tool | (None) ▾ | |
| Sensitivity | (None) ▾ | |
| Search area | (None) ▾ | |
| Padding | L=0 T=0 R=0 B=0 | ... |

FIG.5

LABEL DATA PROCESSING SYSTEM

The present invention relates to the field of product labelling and relates in particular to a system for checking or inspecting labels after they have been made to confirm that they are correct and sufficiently defect-free. The labels may show information such as product identifiers, manufacture dates, batch numbers and item numbers which may be essential for regulatory compliance or to provide provenance information. This is especially important for high value products such as drugs (or candidate drugs used in trails), aviation parts and medical devices, where it is necessary to establish and verify an 'audit trail' from manufacture, during distribution and to the point of use or installation of the end-product.

Labels are typically printed in batches or runs by use of printers and an appropriate print media such as self-adhesive paper labels on spooled backing paper. Typical printers used are ink jet, laser, dye sublimation, dot matrix and wax thermal transfer printers. For reasons of cost and speed of printing wax thermal printers tends to be preferred for label applications.

Defects in printed labels can include many possibilities, such as scratches, spots, missing features or dots or dot clusters, edge bleeding, banding, streaks, misalignment, rotation from axis, and distortion. These can arise due to printer roller misalignment, printer head misalignment, ink problems, paper surface contamination, or raster mismatching causing blanks or skewing.

Historically, label inspection has been undertaken 'manually' by visual inspection by a trained operator, usually of label samples taken periodically. This work is repetitive and dull, leading to operator under performance or other human errors. One study (Bill Smith, "Making war on defects", IEEE Spectrum, vol. 30, no. 9, pp. 43-47, 1993) revealed accuracy rates of only 80%. Human intervention limits the speed with which printed labels can be inspected as well as adding cost to the process. For processes in which every individual label must be inspected (such as pharmaceutical labelling) human inspection is impractical, unless only small label batches are printed.

Machine-based visual inspection can be used using various underlying techniques, which generally involve the production of a reference image against which actual printed images can be compared to identify defective images. Decisions must be made about which portions of the printed label are critical, the amount of deviation from the 'ideal' is allowable, and how to measure this.

U.S. Pat. No. 4,589,141 (1984) discloses an automatic label inspection apparatus in which a TV camera takes an image of a label which is then sent to a pattern and image recognition circuit for verification by comparison with a stored reference label picture. An operator is required to conduct a teaching process in which relevant portions of the label are identified and highlighted by use of a joystick controller.

U.S. Pat. No. 5,755,335 (1995) discloses a machine-based method for inspecting labels for pharmaceutical packaging after application of the label to a container. The container is placed on a rotatable turntable and the label is identified by detecting an edge of the label during rotation. The label is then assessed for compliance with pre-determined standards or specifications for the label, with labels being rejected if there is non-compliance.

More recently, US2002/0087574 discloses a method for automatic inspection of hardcopy labels for use in clinical trials in which a scanning device reads labels after they have been printed. A separate inspection machine is used to scan the labels which are compared against a master label image, which is loaded as a master data file. Different areas of the label are assigned different print quality tolerances according to the sensitivity of the information involved. An automatic stop is activated if a label does not attain the required quality.

WO2011/090475 discloses an automated inspection system for detecting defects in printed images. A raster image is sent to a printer and printed on a print medium (such as paper). A target image of the printed image on the medium is captured by a scanner at a lower resolution than the printed image. The raster image is converted to a reference image and the reference image is compared to the target image so as to detect defects in the target image. The system is tailored to coloured images and the reference image is made up of Cyan, Magenta, Yellow and Black components. Structural similarity measurement methods are used on each colour channel of the target image.

WO 2014/108460 (the contents of which are hereby incorporated by reference) discloses a label inspection system in which a scanner is incorporated into a printer housing so as to permit inline label inspection as the labels are spooled from the print head. Before each label print run an associated 'training image' is created which includes an inspection mask which configures the inspection process to be carried out on a scanned label image by defining regions of the label which include critical data and assigning an appropriate inspection tool to each region in a series of tiers, according to the nature and quality of the image data expected to be found in the scanned image of that area. By dividing the scanned image into regions, and selecting an inspection tool optimised for the region contents, the image processing necessary is less onerous and time-consuming. In prior art label inspection systems such as this, the development of a reference or training image for each label is an onerous task, typically conducted essentially manually by a skilled operative in respect of each label run to be printed. A key feature of a training image is that it has been tested on printed labels and manually optimised (i.e. trained) so as to apply the appropriate tools and tool parameters to produce an accurate inspection for a given label format. The training image and mathematical model is stored for use in subsequent print runs of that label. In this way a library of trained images may be created and stored, and these may be accessed remotely and downloaded when a label print run is carried out at a particular geographical location.

This can be automated somewhat by the provision of GUI-based label creation software which will permit the design of a label format and the specification of the label content. A separate step takes an image of the final label (scanned or photographed) and this is assessed and inspection tools and default parameters are assigned to regions of the label. The operator identifies portions of the label to be inspected, and the nature of the information, such as text or pictures which will be static, or expected to change on a batch-to-batch basis, or on a label to label basis. There will be areas such as frames or boundaries which should not change. There may be text such as brand names, regulatory markings, barcodes, colouring or shading, dots, patterns. There may also be information such as use or storage instructions. Various areas may involve different line fineness, font size, typeface, colour, tone or contrast. Once a region has been defined and an inspection tool designated for that region, the tool must be tested to ensure that it is capable of carrying out an adequate inspection. This may be carried out on pre-printed dummy labels well in advance of an actual batch of labels being printed. To optimise the inspection process inspection parameters such as sensitivity, dimensional tolerance and padding may be changed, algorithms adjusted and the test re-run. Therefore setting up a training image (and the systems creating the mathematical models) may require many hours or even days of skilled work and iterative testing and adjustment.

This is a particular problem in industries in which product labels do not accord to any one set of standards for format, layout or content, so 'off-the-shelf' trained images are rarely available. One prior art approach has been to require users to adopt particular label standards with a pre-determined training image with established regions and inspection tools and algorithms. These would be kept centrally on a remote serve or accessible to download from a website in advance of a label print run. However this ties users to a particular supplier and inhibits flexibility in label design.

Another problem which has been identified is that the data processing demands of label inspection are severe, requiring image analysis routines and methods which are complex and time-consuming. Computer vision software is available both commercially and open source. One commercial supplier is Cognex with its VisionPro and Vision Library machine vision software. An open source supplier is Open CV (Open Source Computer Vision Library). Both of these provide libraries of image inspection tools. Inevitably these tools are configured to provide general vision utility and are not necessarily tailored to the demands of a specific content such as printed label inspection.

A scanned image of a label to a typical resolution of 300 or 600 dpi contains a significant amount of information which must be decoded by image processing techniques and algorithms to allow interpretation. Commonly, in commercial implementations, data processing is carried out on a dedicated processing system remote from the printer/scanner combination. Thus for each label scanned a significant amount of time may be required to scan, send a data packet to the processor, for this to be decoded and the label passed or failed before the next label is scanned or its image assessed. Hence the label inspection process can slow down the label printing process and ultimately affect the entire rate of production and cost.

STATEMENTS OF INVENTION

According to one aspect of the invention there is provided A product label printing and checking system, comprising data processing means configured to:
control the printing of product labels;
control the acquisition and reception of images of the printed labels by an image acquisition device such as an optical scanner; and
check the printed labels for defects,
wherein each printed label accords with a label format specification for that label, whereby the label has a common layout and comprises printed product-related information located in one or more regions on the label,
wherein the data processing means includes a label checking module in which there is provided a reference image of the label, and the checking module is configured so that the acquired images are sequentially compared against the reference image according to pre-determined quality control indicators relating to the expected information content and location in the label regions, and wherein the label is flagged for review or rejection if it is non-compliant.

The label format specification may be determined and/or stored before a print run, in the form of an accessible file. This may then be retrieved by the data processing system before a print run using that label format.

The system is typically configured to output control signals for controlling operation of the printer. The system is typically configured to output control signals for controlling operation of the scanner. The system may be configured to receive and process input signals acquired from the image acquisition device.

In an aspect of the invention the label format specification may be used to provide instructions to be sent to a printer for the printing of each label. Preferably the reference image is an e-image constructed from the label format specification. In a preferred aspect the instructions to be sent to the printer are used to construct the reference e-image. In operation the reference e-image is prepared in parallel with the printing of the associated label.

The reference image is typically provided with an inspection mask which associates regions of the reference image with inspection tools stored in the system, which tools are assigned as appropriate for the type of information to be inspected at corresponding regions on the acquired images. In a preferred arrangement one or more of the inspection tools are assigned to the associated regions using the label format specification and set of rules (or wizard) to choose the best inspection tool and parameter settings.

In a preferred aspect, the reference image is an e-image constructed from information which is used to instruct the printer when printing the label. By using the image sent to the printer to construct (or same process to construct) the reference e-image the degree to which variation between expected printed image and obtained scanned image can vary is greatly limited. However, alternatively, the reference image may be obtained as an imported image of an exemplar compliant label.

The reference image is typically provided with an inspection mask which associates regions of the reference image with inspection tools stored in the system, which tools are appropriate for the type of information to be inspected at corresponding regions on the acquired images. At least one of the inspection tools may have a parameter setting and in developing the inspection mask the parameter is set to a value which optimizes the performance of the tool. Typically most or all of the tools will have one or more parameter settings.

In a particular aspect of the invention the data processing means is configured so that at the start of the process of printing a batch of labels the reference image and its associated inspection mask are established using the label format specification, and optionally inspection tool parameters are assigned. The reference image and its associated inspection mask may thus be configured in real time by assembling specifications for label region location, region information and inspection tool, and optionally inspection tool parameters. This may be carried out by an inspection mask wizard as hereinafter described. The specifications may be assembled, at least in part, by importing label format specifications predetermined when generating the label in advance of the printing process.

In building an inspection mask it is common that in the event of an inspection tool failing (using a tool which is appropriate for the task) to extract the expected features from a region, an iterative process commences whereby tool parameters are adjusted and the inspection is repeated until the inspection is successful. This test inspection and iterative optimisation may be termed a training process.

In prior art processes these inspection mask creation, stored e-image and mathematical model, testing and optimisation steps have been conducted as a separate process well in advance of the label printing step process. By automating the mask creation and optimisation process, and selection of appropriate inspection tools the present inventors have been able to generate the reference image and mathematical model on the fly at the start of a print run, rather than rely upon a pre-prepared and remotely stored e-image and mathematical model.

Once the inspection mask has been created and tested/optimized, the process of checking labels in a production print run can commence. So the checking module is preferably configured so that each inspected region is compared to a corresponding region of the reference image so as to assess compliance of the label as a whole.

Preferably, a golden template comparison (GTC) is used for comparing one or more of the regions on the reference image and the acquired image. The golden template comparison is well suited for one or more regions which are associated with a text or picture inspection tool, and is preferably used for all regions which are associated with a text or picture inspection tool.

In yet another aspect of the invention the reference image is an e-image constructed by using information used when sending print instructions to the printer when preparing to print the first label image. This represents an ideal version of the printed content embodied in the label image. By updating the e-image allowance can be made for serialised data, which changes from label to label.

To ensure efficient processing the e-image and its associated inspection mask should be constructed in parallel with the printer being sent printing instructions and rendering the label image to be printed. Thus the mask can be constructed as the printer is rendering the image.

Labels may be printed in batches which have data which is constant for the batch. In this case each label should be identical in printed content. In many cases there will be a need for serialised data (for product serial numbers say) or randomised data (which may be required in drug trials). In these cases one or more region of the printed label contains serialised or randomised information which changes from label to label. In this case a corresponding region of the e-image may be revised after each label print so that the region in which information changes is populated with the changed information in response to a corresponding change to label print instructions.

To facilitate the image comparison step, various measures may be taken to adjust the reference image to provide a closer match, so that only unintentional defects or errors are highlighted. So, the reference image may be adjusted to have a resolution (usually measured in dots per inch, DPI) which approximates to or preferably matches the resolution of the scanner (and thus its images).

The reference image may be subjected to a blurring filter which imparts a blur to the reference image to closer approximate the appearance of a scanned image. The scanning process inevitably introduces blurring due to the scanning system optics and image sensor properties. A reference image which is an e-image represents an ideal image with sharp edges. However a better comparison with a scanned label image accounts for the inevitable blur (and is best done at a matching resolution), so as to compare like with like.

The system may be configured so that the scanned image is subjected to a geometric transform so as to reduce or correct any distortion present in the scanned image and wherein the transform is applied to the scanned image before the reference and scanned images are compared. The transform is preferably derived by conducting a preliminary comparative analysis of the scanned image with respect to the reference image. Again, this ensures that in the label checking comparison step we are comparing like with like. The scanned image is in any case unlikely to exhibit unacceptably extreme distortion in view of the reasonably tight mechanical tolerances present in such machines. This provides an opportunity to simplify the transform interrogation process by setting boundary limits to the amount of distortion. The transform may be derived from a matching multiple key point analysis of the scanned image with respect to the reference image.

In accordance with yet a further aspect of the invention the system may include a text or picture inspection tool which relies upon matching key points extracted from the reference image with corresponding key points of the scanned image in which translation of the scanned image is calculated by logging key point displacement in both x and y axes. A histogram may be derived from the logged data which represents frequency of key point pairs as a function of relative displacement, and wherein the peak of the histogram is taken to represent a best estimate of the correct key point displacement.

To optimise and simplify the approach, duplicate or spurious key point pairs (which inevitably occur) are binned from the data set by binning key point pairs that do not have a translational displacement within a predetermined distance of the histogram peak, such as within 10 pixels, thereby producing a reduced data set. The histogram peak may be recalculated using the reduced data set.

The data processing means comprises a single computer or a network of computers. At least the acquisition or scanning control and label checking module functions may be carried out by a common computer. The common computer is preferably located close by so as to permit direct cable connection with the scanner.

The system preferably includes the image acquisition device. This could be a digital camera, but typically this is a scanner. The scanner may be: integrated with the printer, or a detachable addition to the printer, or a standalone device disposed spaced apart from the printer. The scanner may be adapted to receive printed media output from the printer in the form of printed product labels and scan these in sequence.

In yet another aspect of the invention the computer hardware is loaded with software and/or provided with firmware adapted to function as a data processing system as hereinbefore described when connected to a printer and an image acquisition device, such as a scanner.

In yet a further aspect of the invention there is provided a physical machine readable data carrier product or digital media storage device loaded with software adapted when run on computer hardware to function as a data processing system as hereinbefore described. In operation the system is connected to a printer and an image acquisition device, such as a scanner.

The printers suitable for use with or in the present invention include print heads, ink supply which may be liquid or wax-based, a paper feed and/or transport mechanism, physical or wireless connectors for a server computer or networked computers.

The image acquisition device could be a camera, but more typically will be scanner with a scan head and sensors, as is known in the art. The scanner may have internal memory, and/or will be configured to send scanning data direct to the data processing unit as hereinbefore described.

The computer will typically have processing architecture and memory (which may be internal to the computer, or external and/or remotely located). There may be visual display unit and a data entry device such as a keyboard, mouse or other such devices. To optimise operation and minimise the sending of data over long distances, there may be a single computer for operating the system and controlling a printer and a scanner (or other acquisition device).

Following is a description by way of example only of modes for putting the present invention, in its various aspects, into effect.

In the figures:—

FIG. 5 is the same image with information blocks applied.

Figure 1:
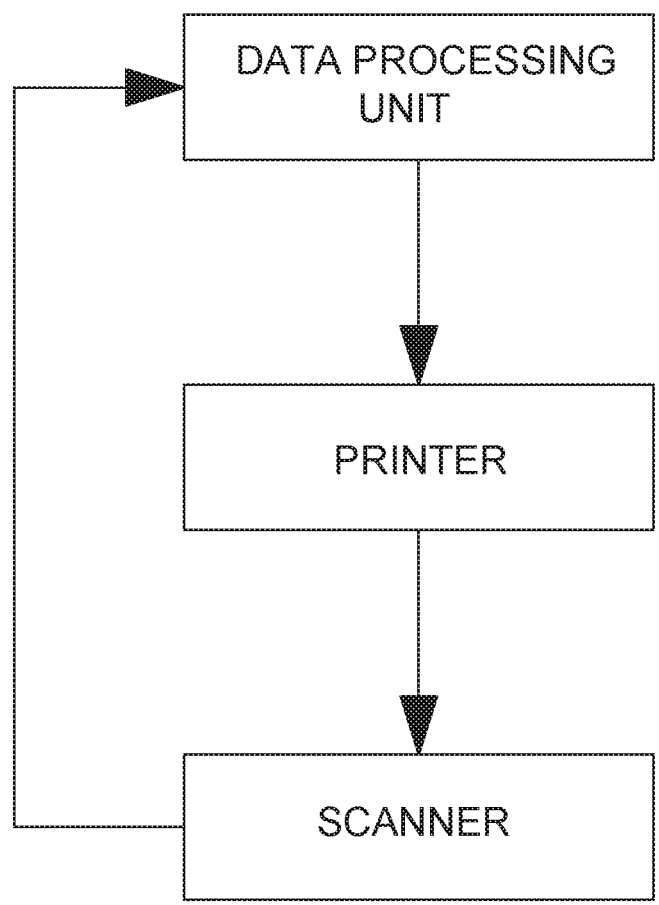
FIG. 1 is a schematic flow chart representing components of a label printing and checking system in accordance with an embodiment of the invention.

FIG. 1 shows schematically a label printing and checking system including associated peripherals for use in the present invention. The data processing unit is in this example a computer configured by software so as to be capable of carrying out the invention described hereinafter and as set out in the claims. The data processing is loaded with software for executing a label design wizard and for carrying out print runs in which each label printed is checked for compliance with a minimum standard. As indicated in the figure the data processing unit is connected to a printer (typically a wax thermal printer) which will be loaded with spooled labels for printing in sequence. As each label is printed it is fed to a scanner, which has a scanner head for scanning each label. The scanner produces a scanned image of each label and this is communicated to the data processing unit for analysis and comparison with a reference image of the label as it was intended to be printed. The invention lies in the configuration of the data processing unit which will be discussed in greater detail below. As such the invention is potentially independent of the printer and scanner which may be any such suitable device known in the art, although is some cases it will include these peripherals.

Figure 2:
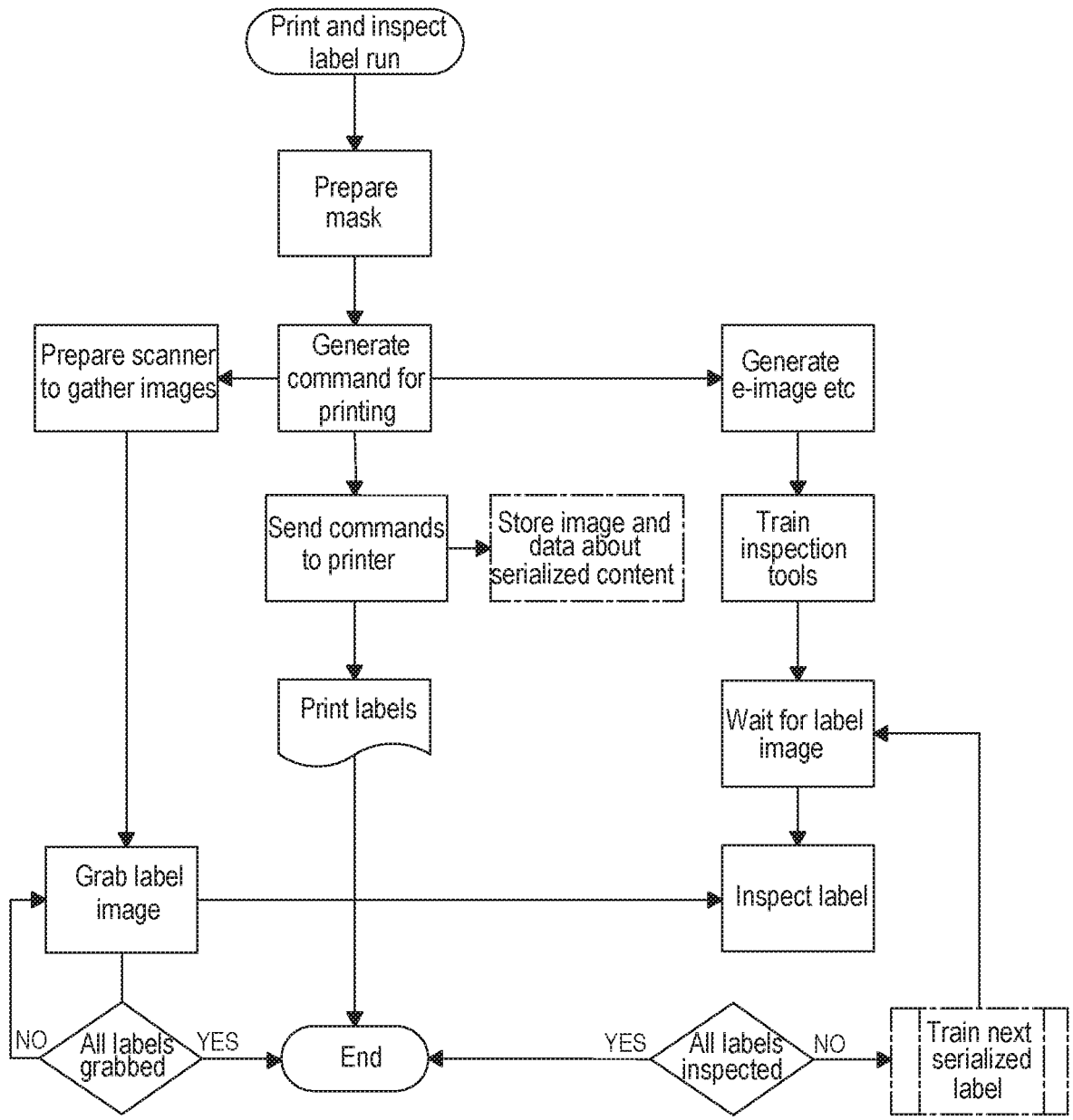
FIG. 2 is a schematic flow chart representing operations carried out by a system in accordance with the present invention.
Figure 2:
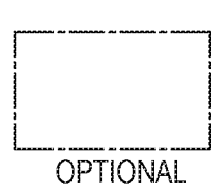

In FIG. 2 the processes conducted by the data processing unit are represented schematically. It is assumed that a label format specification will have been prepared. The print run for the label is configured and in a first step the inspection mask is prepared, this step may be done in advance. An operator may choose to use a pre-existing label design (with an associated label format specification to be retrieved).

Once the label format specification retrieved from memory, preparing of an inspection mask may commence. This may be done in advance of or at the start of the print batch run. As a first step an inspection mask is created. The inspection mask wizard analyses the label content (information and layout) and selects appropriate image analysis tools for the types of information that will be present; e.g. text, image, logo, lines etc.

At the start of the print batch run, a command for label printing is generated which is sent to the printer. The same printing instructions are used to generate an e-image of the first label to be printed. The e-image is adjusted by applying a blur mask and by resizing to match the scanner resolution, thereby to make the e-image as close as it can be.

The inspection tools specified in the inspection mask are then trained using the e-image, information about from the label specification and the tools parameters settings.

So the system may be configured to conduct a preliminary inspection tool training process which is conducted on the reference image (or e-image) and may operate so that in the event of an inspection tool failing to extract the expected features from a region, an iterative process commences whereby tool parameters are adjusted and the inspection is repeated until the inspection is successful. Once trained the system is ready to conduct label checks.

In accordance with a novel aspect of the invention, while the training takes place a label is printed. The scanner is activated and acquires a scanned image of the printed label. This label scanned image is then compared to the e-image by using the inspection tools defined in the inspection mask. For serialised data (which changes label by label) the e-image may be reconfigured to reflect the changing label information sent to the printer. The scanning and comparison process continues until the batch has been printed and all labels checked. In the event that a non-compliant label is flagged various responses may be followed, such as interrupting printing or sounding alarm. If the content is not changing label by label, the e-Image and trained inspections tools are not regenerated for the rest of the labels.

In the following pages we describe in detail the various process steps involved in working the invention in particular embodiments.

Label Creation—Label Wizard

Label generating software is used by an operator to create labels for a particular print run or multiple print runs for same product or set of data.

A label format comprises a list of regions, in this case blocks. The label format can be linked to a schema which will precisely specify all the data needed to produce the Label. One schema can refer to another schema to form hierarchies. All the data available to a label will form a tree structure which will be presented to the user as a variables pane that is docked to the side of a label editor.

The user can use drag/drop to populate the Label with content from the variable pane:
- String variables can be dragged from the pane and dropped into the label to create new text blocks.
- Reference variables, which appear as containers above a group of related variables, can be dragged into the label to insert a sub-label.
- Multi-language string variables have their own particular representation in the variables pane.
- Image variables can be dragged onto the label in order to add a variable image to the label.
- Variables can be dragged into a cell within a table in order to add the default content into that cell of the table.

Block Positioning

The blocks on a label have a rectangular bounding box. The available blocks will include the following:
- Text—rich text formatting, word-wrapping and insertion of multiple variables. The width of the text in a block may be stretched or reduced. The application will allow text to auto-fit the block it is being rendered in. This is controlled by the Fit To Space parameter on the Text block. This will then allow entry of the maximum and minimum point sizes for the text. Width stretching can optionally be enabled which will allow the font width to be increased if the best point size fits, or reduced if the smallest point size overflows. The width stretching has maximum and minimum percentage settings.

Barcode—a range of barcode symbologies are supported, in accordance with standard practice in the art. In order to correctly preview barcode blocks on screen, the interface will feature a control that will allow the user to set the resolution of the printer that the label will be printed to. This will calculate the space that the printed barcode will take up on the label. The application will also allow a user to auto-fit a barcode to a specific block size by calculating the best fit for unit size and line height.

Picture—only Image Entities that reside within the Label Design System will be supported to be added to the Label formats.

Line—a horizontal or vertical line between two points can be specified, with standard options for how the line is stroked.

Shape—rectangles (including rounded corner rectangles) or ellipses, optionally stroked/filled shapes.

Table—a specific number of rows and columns can be specified. Other blocks can be placed in the table, so that their positions and sizes do not have to be manually adjusted to make them line up; they get their positions automatically from the arrangement of the table.

Sub-Label—a reference to another Label format, so the referred-to Label is rendered on the parent Label (see below).

Rich Text Content—when adding a text block to a label, the user can add Rich Text content using either individual character level control or block level control of the formatting. Character level format control is available when a text block is open for editing.

The following capabilities are made available to the user:
1. Selection of Font to use for selected text
2. Selection of Font size for selected text
3. Toggle Bold for the selected text
4. Toggle Italic for the selected text
5. Toggle Underlined for the selected text
6. Toggle Strikethrough for the selected text
7. Left Aligned the selected text
8. Centred the selected text
9. Right Aligned the selected text
10. Justify the selected text
11. Superscript the selected text
12. Subscript the selected text
13. Font Colour and background colour for the selected When a Rich Text Variable type is specified within a schema this gives the user the ability to specify Text content as well as the formatting associated with the text. This can be used to specify chemical formulae using sub- or superscript text as well as choose a colour for specific text within the data rather than within the label format.

Sub-Labels

Any Label Format can itself be used as a block within another Label Format. A Label positioned within the layout of another Label acts as a sub-label. Just as a text block can be configured to use a variable to provide it with text data, a sub-label block must be configured to use a variable to provide it with the data it needs. The use of sub-labels can extend to any depth required. So specific batches could use custom labels that are mostly taken care of by a generic product label, by consuming it as a sub-label that covers the entire space. They could then insert extra variables into the blank space in the centre.

Label Variables

Label variables allow label specific data (i.e. information which changes from label to label) to be defined and placed upon a layout. This data can either be sequence numbers, date-times or lists. Once defined, these label variables are specific to the label format within which they have been defined. Sequence numbers will have a start value, increment and a value to indicate the number of times the sequence is iterated. The maximum length of the number will be specified and it may also be configured to have leading zeroes. These values may be constant, calculated, fields within available Schemas or prompted variables.

Inspection Mask and Training

With a prior art stand-alone vision inspection system operators need to take a scan of a real label then perform a laborious task to manually mark up each region of that scanned label and define how that region is to be inspected. In accordance with the present invention the wizard in combination with the knowledge the label system holds for the label design/content allows for this process to be automated; this reduces the time required to do this manually by a significant amount plus is designed to remove the need for a vision engineer to be involved.

Labels and Printing

A typical system for label checking includes on the one hand a printer which receives label printing instructions from label printing software loaded onto a printer-serving computer. The printer in preferred aspects is a wax thermal printer which provides low cost per print and rapid printing. However other printers could be used including inkjet, dye sublimation, dot matrix or laser printers. For applications such as medicine or clinical trial labelling it is usually necessary to defect test every printed label in each batch.

The labels are typically printed in batches on self-adhesive paper labels attached to a backing web from which the labels can be unpeeled for attachment to a container or package. Of course the invention is not limited to such labels and any suitable print media can be used such as: plain paper, polymer film, package cut-outs (for forming containers), cardboard, provided that the medium can be transported past the print head so as to permit printing thereon.

The printed label in its simplest sense might be a product code expressed in alphanumeric text. More usually there will be a mixture of texts, such as branding, use instructions, batch numbers, product numbers, certification marks, manufacture dates, use-by dates, weight values, and so on. The text may be present in the same of different typefaces, font sizes and in different orientations (e.g. horizontal or vertical). Text may be in different languages or may be in non-Latin text, such as Chinese and Japanese symbols or Arabic letters. There may also be pictures such a product images, trade marks, logos, schematic instructions. The pictures may be monotone, grey scale toned or dithered. The labels may have pre-printed borders, boxes or other images and text.

The printed information may be product specific, batch specific or serial (in the sense that each label has different information such as item numbers or unique product serial numbers). The data may also be non-sequential and for clinical trials may be randomised. The labels may be different shapes, square, oblong, rounded, oval, or any other shape the designer has specified. Labels may come in any format, layout, content and with information which is static, batch-specific or product/item specific. In practice many labels are generally rectilinear but with rounded corners. The rounded corners are useful visual features for identifying the location and orientation of a label in an image.

The printed labels may in some embodiments be printed in a batch and the label stack transferred to a separate scanner for scanning of the labels. In this case the scanner will typically include a tractor feed (or similar) for drawing a roll or concertina of the printed media (on any associated backing layer) through the scanner. Instead of a scanner to capture label images, it would be possible to use digital images captured of each label on a photographic sensor. However the preferred arrangement for the present invention is to mount a scanner immediately downstream of the print head of a printer so that as soon as they have been printed the labels are scanned to capture a sequence of scanned images of the printed labels. The printer and scanner may be integrated in a single machine or may be two separate items combined together. Usually it is the latter in cases where a label printing system is being modified to carry out a print run in which label accuracy is critical and must be checked.

In order to address any printing problems which arise, it is important in most embodiments that label checking be carried out 'on the fly' and synchronised with the label printing process, so that if a defect is detected the print run can be paused or slowed, or printing parameters adjusted to address the issue causing the defect. In a batch-operated process in which defect detection is separate the batch printing, any defective labels will still be detected, but if any defects prove to be systemic across a proportion of the labels, then considerable wasted time and material will arise.

Defects which may occur include drifting of the information from its intended location, scratches, spots or 'blobs', missing portions or dots, streaks, banding and intensity variation. The defects may be isolated, or may form a trend which may become worse over time. Some defects may require a label to be rejected whereas others are less critical and can be allowed, or may be used to indicate that printer servicing may be required. However for critical applications such as medical, pharmaceutical or drug trial applications we are primarily concerned with detecting and responding to labels which must be rejected. It must also be recognised that errors can be introduced not just during printing, but also during the scanning process, so scanner alignment, stability and tolerances with respect to the transported print medium (e.g. label arrays) are vital to avoid false results and needless rejections. However printer errors tend to dominate as they are inherently more prone to produce defects (by various modes) than scanners which involve optical interaction.

The scanned images are each then compared, usually one by one, with a reference image which represents the intended or target label content. In the present invention the reference image is a digital or electronic 'e-image' which is derived from an actual image of a specimen label, or in preferred embodiments is derived printing instructions to be sent to the label printer.

Preparation of Inspection Mask

The inventors have identified that many of the steps involved in setting-up an inspection mask and troubleshooting it to get it working reliably could be defined by simple rules. These rules may need to be used many times for different labels having underlying similarities in the nature and format of information shown. So a wizard was created to automate the establishment of these rules. The wizard attempts to create a good inspection of labels by identifying suitable inspection tools and sensitivities for each block on the label, including different sets of product data printed on the label.

In a preferred aspect, the system of the present invention can automatically mark-up a label for inspection by using an inspection mask wizard and script. The wizard may be run in relation to previously obtained label images to obtain a provisional mask. The provisional mask may then be used in an inspection process. In the likely event that fine-tuning of the provisional mask is required due to sub-standard initial performance, the wizard can be set to automatically make changes to image processing, or may flag to an operator a recommendation to change the mask, which can then be invoked by an operator. The provisional mask is made by the wizard pre-analysing label format and content using the inspection wizard, to choose the correct image processing inspection tool (for e.g. text or pictures) and the sensitivity options for each tool. The wizard may also be adapted to check for areas of overlapping content on the label and to provide a masking protocol so as to handle these areas correctly. Once the provisional inspection mask has been developed a test label inspection is conducted to see if any training errors or warnings occur. However, preferably, no training image or converted training image is stored in the data processing means (or any associated data storage facility).

For each printable block on the label format, the wizard will select an appropriate inspection tool, inspection sensitivity and search area and will proceed to test that a vision inspection runtime component can successfully identify each block when presented with an ideal representation of the block. If any block fails the initial attempt, the wizard will follow predetermined protocols regarding how to adjust the parameters of the inspection in order to iteratively arrive at a successful identification.

For example, a block on a label is processed by the wizard, which initially starts by setting the 'high quality' inspection tool with high sensitivity and tight search area. If an inspection subsequently conducted cannot be successfully identified by the vision runtime component under ideal circumstances then the wizard may be programmed to choose to use the 'high quality' inspection tool with medium sensitivity (rather than high) and tight search area in order to achieve an identification pass. Once a pass has been obtained for all label regions the inspection mask can be used in a label printing and inspection process.

During the training/testing time, the wizard can be instructed to use the scanned results to permit manual modification of the inspection mask. The wizard will provide recommendations for changes to be made to the inspection mask, which may be accepted or rejected by the user. Alternatively, the user may amend the mask settings manually in order to make adjustments as needed to meet the inspection requirements. The recommendations will typically be presented to the user in textual form with the option to apply changes or see more details. If this is the case, the user will preferably be shown a graphical example of an error or problem related to the recommendation being made.

To simplify the process of creating an inspection mask, the inspection mask wizard may be used to automatically create a candidate inspection mask then train the inspection mask for the target label format. The inspection mask wizard script defines how the image analysis process will associate each type of designed and printed label block with each of the various inspection tools, their sensitivities and defined search areas that are embodied within the inspection mask configuration. The script will also define how the wizard should act in the event of a failure to 'train on' or recognise a specific block.

In one more detailed example of the invention some of the steps the wizard takes at training time are:
1. If the label has a label stock with rounded corners, create a fixture layer of 4 corners.
2. For each block, a default inspection tool, sensitivity and search area based upon the predetermined settings in the inspection wizard profile will be used. For certain types of blocks there may be additional decisions.
  a. If a block is Text—choose an accuracy of inspection based on text size (and if using some complex characters such as Chinese).
  b. If it is a Picture, determine whether the image is dithered or not and use appropriate settings.
  c. If the block is a barcode and the size of individual barcode lines is small, set just to read barcode and not to grade it.
3. Add a default padding to blocks, taking into account how near to the edge of the label the block is.
4. Examine if there is any block overlap. If there is, try and reduce the block size by using padding. If padding cannot be used, cut out a number of exclusions on the block that has no printed content. There may be some blocks for which the final content be may unknown, in which case the wizard may generate recommendations for a user to decide on the exclusion cut out.

When testing scanned images, the wizard will try and solve common inspection errors with alternative settings. For example, if a corner is not found it will try a setting to detect a dark corner (i.e. if the label stock is darker than background).

Printing Process

Once a mask has been prepared for a label to be used in printing a label batch the print process can take place. The flow chart in Figure [flow chart] shows the printing process schematically. The inspection mask developed previously (see above) is retrieved. The label generation software provides image information for the first label in the form of printing instructions to be communicated to a printer. The same image information is used to generate an electronic or digital image (e-image) of the label to be printed. This includes any pictures, text, borders that will be printed. The entire e-image is modified by re-scaling the resolution to match that of the label scanner used in the inspection process (if there is a resolution difference, which will typically be true as the resolution of the scanner will usually be higher than that of the printer image) and applying a blurring layer to mimic the inevitable image blurring that will occur due to the performance limitations of the scanner.

Inspection Tool Training

The inspection tools are tested/trained using the e-image as a test image. The process goes through each region/block in the label and does the following:
1. Create an instance of the inspection tool specified for that region/block.
2. Set a parameter of the inspection tool based on sensitivity (and any overrides previously specified by the user).
3. Run training phase on the tool. This will be given the e-Image, location of the region and the content of the region. This will generate a mathematical model of the region if required by the tool. The tool may also produce a different image of the region if needed, such as by extract blurring.

Different tools do different work at this stage. Some use the e-Image for image data, others do not require the e-image and just use a description of the region to indicate the nature of the content.

One important tool is the Text and Picture Tool. This extracts key points of the e-Image and generates various blurred images for use in the image subtraction/comparison stage to be used when doing an actual inspection of a scanned label.

Meanwhile, the label image is printed onto a label provided on a releasable backing layer. The printed image is scanned by a scanner disposed immediately downstream of the printer's printing head. The scanned image will have a resolution dictated by the scanner properties or settings, and may be subject to scanning artefacts arising from the scanning process, as well as artefacts arising from printing imperfections present in the printed image.

Label Inspection Process

The scanned label image is then subject to an inspection process called Inspect Label. This runs the different inspection tools to inspect the scanned label against the e-image. A set of tools runs first to find the rough location of the label content (in most cases starting with the label corners). Once these have been run the rest of the tools are be run.

For each region the inspection step:
1. Uses the instance of the tool created in the 'Train Inspection Tool' stage.
2. The module is given the scanned label image.
3. The module is given the transformation from the scanned image to location on the trained (e-image). This is the rough location where the content may be expected to be found.

Each tool uses information provided and any model it builds, or has been provided during the training stage, in order to do the inspection.

The Text and Picture Tool extracts the region of interest from the scanned label image. It will then extract the key-points. It will try and match them with the corresponding key-points on the e-image, as described below.

Feature Extraction

An important part of the label comparison processing as between the reference e-image and the scanned image is the feature matching step in which characterising features which act as benchmark (or key point) with respect to which the location of the other label contents or regions can be defined. In this context such features could be edges or preferably corners, or the results of a mathematical function, such as a partial derivative in both (x and y) directions. A filter finds all potential features in an image. Because there may be many similar features a 'descriptor' is defined to help match the sought characterising features. The descriptor is an abstract way of describing an area of the image around the feature.

It is common practice to look for corner-like objects. This process involves significant and complex computation. Off-the shelf computation methods are tailored to be capable of matching a wide range of images irrespective of any translation, rotation, skewing or scaling of the image. Descriptors from the e-image are compared to descriptors that are most similar from the scanned image. Of the many possible candidate features, the best match descriptors are chosen as between the e-image and the scanned image. Because no quantification of mismatches due to rotation or translation or scaling will have yet occurred, no location information can be relied upon. To deal with scaling mismatches the source image is scaled to a number of levels, and the features/descriptors extracted for each of these levels. In this way the matching process becomes scale invariant. To handle rotation a form of rotation invariant descriptor is selected. Using multi-scalar features and their descriptors can add significant amounts of processing time. Similarly the use of rotation invariant descriptors uses additional processing time. In practice the extraction of features such as corners and their descriptors in a single label can take several seconds. This means that the training of an inspection mask for a label can take a significant amount of time, which mitigates towards conducting this step well in advance of a prior art batch printing process being carried out.

The present inventors have realised that for the analysis of printed and then scanned labels the ability to use a scale and rotation-invariant feature in the feature extraction and descriptor process is not required. In practice a scanned image will have a known resolution and usually only shows very slight rotation and scaling variations as compared to the reference e-image. One may expect to see slight localized scaling and rotation variations in parts of the label. However, neither multi-scalar features nor the extraction of multi-scalar sets or descriptors are required. Similarly, rotation invariant descriptors are not needed. So the computation process may be simplified and the processing time radically reduced.

Furthermore the present inventors have identified that the matching of features extracted (key points) represents a limiting step in the image comparison processing. The 'best matching' step referred to in the foregoing can be time consuming due to the finding of false positives (false matches), especially due to the presence of 'outliers' such as similar but not target key points. It is important to match key points from the scanned image with those of the e-image in order to develop a transform to be applied to the scanned image so as to ensure that coherent registration of the scanned and e-images is potentially possible during the comparison step. The formulas for creating such transforms involve solving or approximating simultaneous equations, which can be time consuming, and wasteful for false positives, potentially even producing an erroneous transform which will undermine the entire label comparison process.

The prior art method of excluding outliers is known as random sampling and census (RANSAC). This is a 'trial and error' process in which 3 or 4 key point pairs are selected from an image. These are checked to not lie on a straight line. A transform is calculated for these points (i.e. they are assumed to be correct target features). The transform is applied to all other points. A census is taken of the points to establish if they are within a reasonable end distance of one another. If not (i.e. beyond a certain threshold) the trial is abandoned and alternative random points are picked and the process starts again. The points that provide the closest end distance tolerances are used to develop the transform. When there are large numbers of outlier key points, the process can take a long time and can generate bad transforms.

When inspecting labels the presence of text can create pluralities of non-unique key points each time a letter is repeated in a given area. Again, large rotation and scaling of images does not occur due to the constraints of the printing and scanning process limiting these to tiny localised effects. The former is a problem and can make matching more difficult. The latter provides the possibility of simplifying computations in image processing. Because the image sizes of the e-image and the scanned image are known and can be matched, it is possible to use location information when matching key points with respect to one another. The location information extracted is relative rather than absolute.

So in accordance with another aspect of the invention there is provided a method of matching key points extracted from an e-image with those of a scanned image in which the translation of the image is calculated in both x and y displacement axes. A histogram is then created which represents frequency of key points as a function of relative displacement.

A list of actual key point pairs is developed by binning pairs that do not have a translational displacement within a predetermined, small distance of the histogram peak (in one example within 10 pixels). Thus duplicate key point pairs are removed, as are the large majority of outlier key points. As a result the computational processing required in the RANSAC stage is considerably reduced, so runs faster and gives more reliable transforms.

So the inspection tools defined in the inspection mask are applied to the previously identified features, blocks and areas which appear in the mask and are associated with the tools. As part of the inspection process the label is identified on the scanned image. This may be done by identifying certain fixed features (fixtures). As most labels have curved corner features, the corners may be used for this purpose, and to define a 'fixture layer'. Any image shift, or rotation or distortion of the image during printing will be reflected in a mismatch or distortion of the expected positions of the corners. From this a transformation is calculated and applied to the scanned image so as to provide a better match and permit an effective comparison of scanned image and e-image label contents.

The scanned image is then analysed block-by-block or feature-by-feature by the previously selected inspection tools and in accordance with the associated parameters such as sensitivity, padding etc. Because the appropriate tool is selected and applied on a local area the image processing is more efficient and less time consuming than if an entire image were analysed as a whole.

Text blocks and picture blocks from the scanned image are compared with the corresponding text blocks and picture blocks isolated from the e-image. A golden template comparison (GTC) is conducted by which images are overlapped, transformed and (if necessary scaled) to give a best fit, and then the images are subtracted, one from the other to give a difference image. An example of a GTC process is described in more detail in U.S. Pat. No. 5,640,200.

A label is passed or rejected based upon whether the difference (or mismatch) exceeds certain threshold values. For instance missing part of text or image beyond a certain size could be considered as a defect.

Serialized Data

In cases where there is serialized data present on the label (i.e. information which changes from label to label, such as serial number or patient number) the e-image derived from the printer instructions is updated to reflect each incremental change, so that the e-image information will match the printed and scanned images for the sequentially printed labels.

Specific Embodiment

Figure 3:
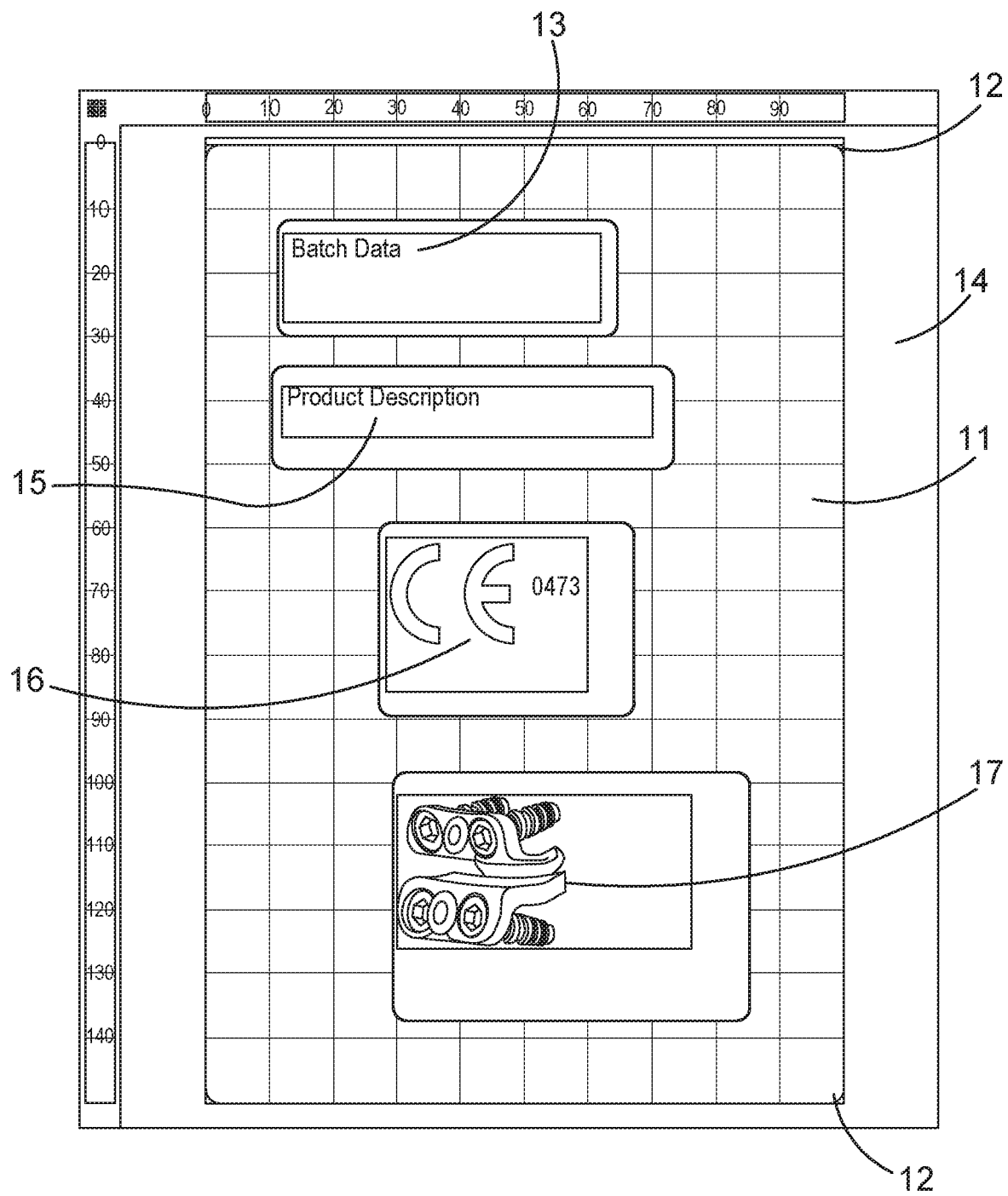
FIG. 3 is a flow chart for the generation of a reference e-image.

A simple example of a notional printed medical device label 10 is shown in the screen grab of FIG. 3. The label comprises a paper sheet 11 which has a generally oblong plan with rounded corners 12. The label has a self-adhesive rear face (not visible) which is attached to a backing layer 14. At an upper end region of the label there is a region for text 13 showing an alphanumeric representation of product batch data. The text has a particular font design, font size and character spacing. Below the batch data there is further text 15 showing product description information. The font design, font size and character spacing in this case matches the batch data text. In the middle region of the label there is a simple picture 16 which shows a European certification (CE) mark. This comprises a mixture of two fonts. One large font for CE and another smaller font for the number 0473 to the right hand side. At the lower region of the label is a monotone dithered grey scale picture 17 of the medical device which is to be labelled.

Figure 4:
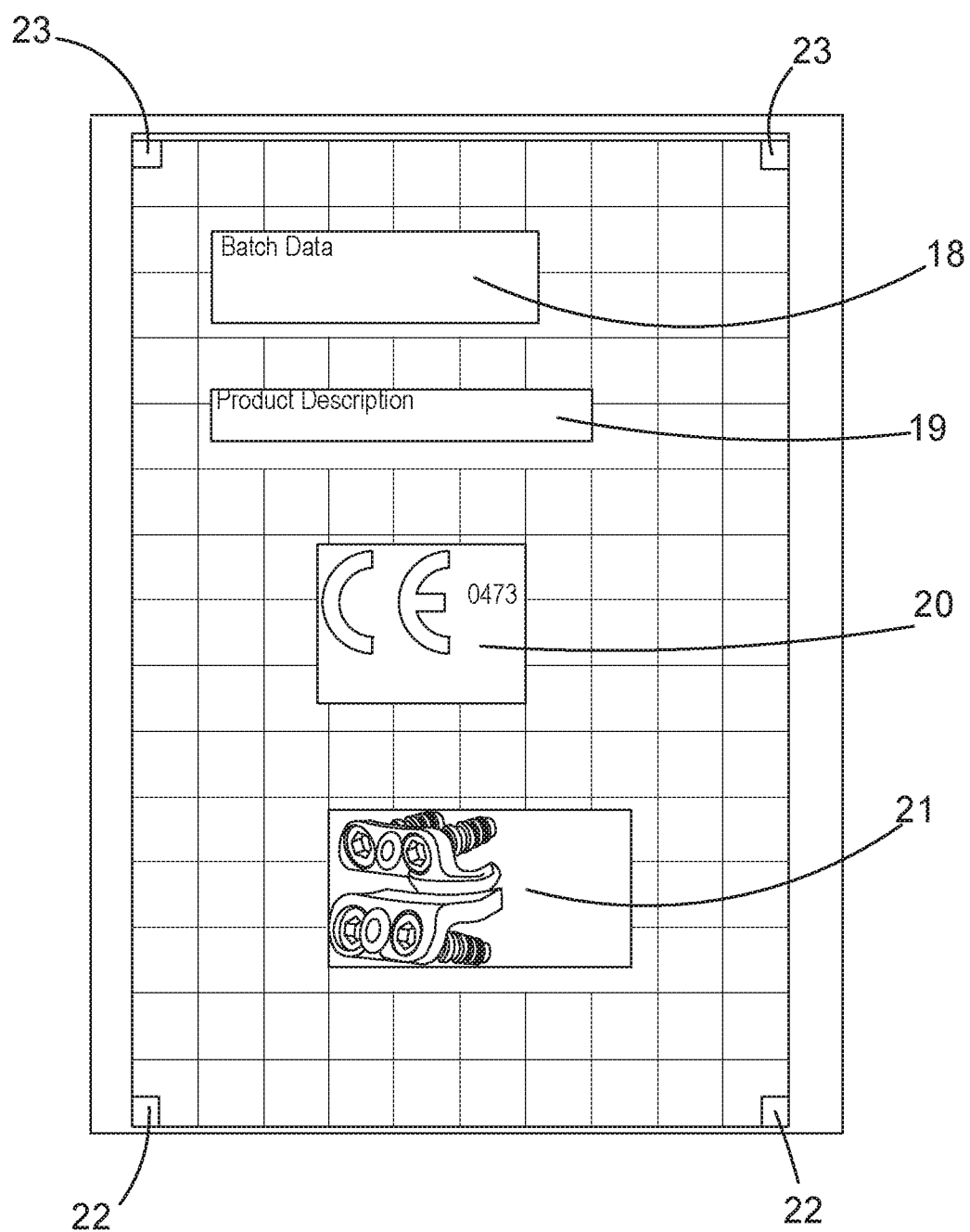
FIG. 4 is screenshot image of an example of a notional simple label design.

To generate an inspection mask from this label oblong inspection blocks 18, 19, 20, 21 are applied to the each of the four text, and corner blocks 22, 23 for the label corners (FIG. 4). For each block an inspection wizard script is run. So in FIG. 5 one can see the wizard before being applied to the label. There are a series of dialog boxes that can be viewed or modified once the wizard has been run. There is a switch to invoke use of the wizard. The wizard uses the label format specification to identify the nature of the information in each block (i.e. text, or picture, dithered picture, barcode if present, non-Latin scripts (e.g. Arabic or Chinese). An appropriate inspection tool is then applied for each block (or region). The wizard then applies some pre-determined default parameter values to the various blocks.

The wizard goes through the various blocks of the label and assigns an appropriate 'first try' for the settings that will be used during an actual label inspection run. This includes choosing the appropriate inspection tool from the image recognition toolkit (label corner tool, text tool, graphics tool, dithered graphics tool etc.). Various sensitivity levels are available for each tool—low, medium and high. The search area associated with a block typically starts as 'tight' in relation to the blocks, extending as a rectangle slightly beyond the block perimeter. Padding is typically set to 0.5 mm on all block sides.

So, initially the wizard identifies the rounded corners 22,23 of the label which then serve as reference points from which the expected location of other label features can be derived, based upon the pre-existing knowledge of the label format. The label blocks are then assessed and the tools and sensitivities to be tried are populated for each block. So for the present example the following settings for the mask wizard FIG. 5 are designated:

Corners—Top Left, Top Right, Bottom Left, Bottom Right
  Fixture: Label Stock
  Fixture Point
  Inspection Tool: Label Corner
  Sensitivity: Medium
  Search Area: Thin and Long
  Rectangle: 4 mm×4 mm The batch data text is then identified and the appropriate inspection tool 'Text' is designated. The sensitivity is set to a default 'medium'. The 'search area' is tight and the padding applied in 0.5 mm on all sides of the block:

Text—Batch Data
  Fixture: Label Stock
  Inspection Tool: Text
  Sensitivity: Medium
  Search Area: Tight
  Padding: 0.5 mm all sides A similar set of settings is populated for the product description:

Text—Product Description
  Fixture: Label Stock
  Inspection Tool: Text
  Sensitivity: Medium
  Search Area: Tight
  Padding: 0.5 mm all sides The certification mark picture invokes a specific
Picture—CE Mark
  Fixture: Label Stock
  Inspection Tool: Graphics
  Sensitivity: High
  Search Area: Tight
  Padding: 0.5 mm all sides
Picture—Product Image
  Fixture: Label Stock
  Inspection Tool: Dithered Graphics
  Sensitivity: High
  Search Area: Tight
  Padding: 0.5 mm all sides In summary the invention in one aspect provides a product label printing and checking system, comprising data processing means configured to: control the printing of product labels; control the acquisition and reception of images of the printed labels by an image acquisition device such as an optical scanner; and check the printed labels for defects, wherein each printed label accords with a label format specification for that label, whereby the label has a common layout and comprises printed product-related information located in one or more regions on the label, wherein the data processing means includes a label checking module in which there is provided a reference image of the label, and the checking module is configured so that the acquired images are sequentially compared against the reference image according to pre-determined quality control indicators relating to the expected information content and location in the label regions, and wherein the label is flagged for review or rejection if it is non-compliant. The label format specification may be determined and/or stored before a print run, in the form of an accessible file. This may then be retrieved by the system before a print run using that label format. In an aspect of the invention the label format specification may be used to provide instructions to be sent to a printer for the printing of each label. The reference image and its associated inspection mask may thus be configured in real time by assembling specifications for label region location, region information and inspection tool, and optionally inspection tool parameters.

The invention claimed is:

1. A product label printing and checking system comprising data processing means configured to:
  control the printing of product labels;
  control the acquisition and reception of images of the printed labels by an image acquisition device; and
  check the printed labels for defects,
  wherein each printed label accords with a label format specification for that label, whereby the label has a common layout and comprises printed product-related information located in one or more regions on the label,
  wherein the data processing means includes a label checking module in which there is provided a reference image of the label, and the checking module is configured so that the acquired images are sequentially compared against the reference image according to pre determined quality control indicators relating to the expected information content and location in the label regions, and wherein the label is flagged for review or rejection if it is non compliant,
  wherein the reference image is provided with an inspection mask which associates regions of the reference image with inspection tools stored in the system, which tools are assigned as appropriate for the type of information to be inspected at corresponding regions on the acquired images, and wherein the data processing means is configured so that at the start of the process of printing a batch of labels the reference image and its associated inspection mask are established using the label format specification.

2. A system as claimed in claim 1 wherein the reference image and its associated inspection process is configured in real time by assembling specifications for label region location, region information and associated inspection tool.

3. A system as claimed in claim 1 wherein the system is configured to output control signals for controlling operation of the printer and is configured to output control signals for controlling operation of the scanner, and to receive and process input signals acquired from the image acquisition device.

4. A system as claimed in claim 1 wherein the label format specification is determined or stored before a print run, in the form of an accessible file.

5. A system as claimed in claim 1 wherein the label format specification is used to provide instructions to be sent to a printer for the printing of each label.

6. A system as claimed in claim 5 wherein the reference image is an e-image constructed from the label format specification, and wherein the instructions to be sent to the printer are used to construct the reference e-image.

7. A system as claimed in claim 1 wherein one or more of the inspection tools are assigned to the associated regions of the reference image using the label format specification.

8. A system label as claimed in claim 7 wherein at least one of the inspection tools has a parameter setting and in developing the inspection mask the parameter is set to a value which optimizes the performance of the tool.

9. A system as claimed in claim 1 wherein the reference image and the inspection tools are established in parallel with the printing of the first label.

10. A system as claimed in claimed claim 8 wherein the checking module is configured so that each inspected region is compared to a corresponding region of the reference image so as to assess compliance of the label as a whole.

11. A system as claimed in claim 1 wherein the reference image is an e-image constructed by using information used when sending print instructions to the printer when preparing to print the first label image.

12. A system as claimed in claim 11 wherein the e-image and its associated inspection mask are constructed in parallel with the printer being sent printing instructions and rendering the label image to be printed.

13. A system as claimed in claim 11 wherein a region of the printed label contains serialised or randomised information which changes from label to label and a corresponding region of the e-image is revised after each label print so that the region in which information changes is populated with the changed information in response to a corresponding change to label print instructions.

14. A system as claimed in claim 11 wherein the e-image region in which information changes is associated with an optical character recognition tool or optical character visualisation tool.

15. A method of printing and checking product labels comprising operating a system according to claim 1.

16. Computer hardware which is loaded with software or provided with firmware adapted to function as a product label printing and checking system according to claim 1 when connected to a printer and an image acquisition device.

17. A non-transitory physical machine-readable data carrier product loaded with software adapted when run on a computer to function as a product label printing and checking system according to claim 1.

18. A system as claimed in claim 1 configured to conduct a preliminary inspection tool training process which is conducted on the reference image and operates so that in the event of an inspection tool failing to extract the expected features from a region, an iterative process commences whereby tool parameters are adjusted and the inspection is repeated until the inspection is successful.

* * * * *